United States Patent [19]
Richardson

[11] Patent Number: 5,909,892
[45] Date of Patent: Jun. 8, 1999

[54] SELF-ALIGNING TRAILER HITCH ARRANGEMENT

[76] Inventor: Ronald Harold Richardson, R.R.#4, Merrickville, Ontario, Canada, K0G 1N0

[21] Appl. No.: 08/823,310

[22] Filed: Mar. 21, 1997

[30] Foreign Application Priority Data

Feb. 6, 1997 [CA] Canada .................................. 2196967

[51] Int. Cl.$^6$ .................................................. B60D 13/00
[52] U.S. Cl. .......................... 280/477; 280/511; 280/504
[58] Field of Search .............................. 280/54, 504, 507, 280/512, 477, 478.1, 508

[56] References Cited

U.S. PATENT DOCUMENTS

| | | | |
|---|---|---|---|
| 3,759,548 | 9/1973 | Kothmann | 280/511 |
| 4,657,275 | 4/1987 | Carroll | 280/477 |
| 4,781,394 | 11/1988 | Schwarz et al. | 280/477 |
| 4,903,978 | 2/1990 | Schrum, III | 284/477 |
| 5,080,386 | 1/1992 | Lazar | 280/477 |
| 5,435,587 | 7/1995 | Beddows | 280/477 |
| 5,465,922 | 11/1995 | Anderson | 280/477 |
| 5,503,422 | 4/1996 | Austin | 280/477 |
| 5,516,139 | 5/1996 | Woods | 280/477 |
| 5,758,893 | 6/1998 | Schultz | 280/477 |

*Primary Examiner*—J J Swann
*Assistant Examiner*—Lynda Jasmin
*Attorney, Agent, or Firm*—Jones, Tullar & Cooper, P.C.

[57] ABSTRACT

A self aligning hitch arrangement for attachment to the drawbar of a towing vehicle for lifting and aligning a trailer tongue into place on a towing ball includes a mounting plate attachable to the drawbar and having side members which support a horizontal transverse pivot in front of (i.e. on the vehicle side of) the ball. A ramp member supported by the pivot has a ramp plate with its front edge spaced behind the ball member, and is pivotable between a raised position in which the plate lies at a suitable angle for lifting the trailer tongue onto the ball, and a lowered position in which the plate lies at a steeper angle and allows the tongue to fall onto the ball. The ramp member also has diverging flanges to guide the trailer tongue laterally into position over the ball. A latch carried by the side members can hold the ramp member in its raised position and has an abutment which is struck by the tongue as this becomes located over the ball, causing it to release the ramp member and allowing this to fall to its lowered position while the tongue falls onto the ball.

10 Claims, 3 Drawing Sheets

5,909,892

SELF-ALIGNING TRAILER HITCH ARRANGEMENT

BACKGROUND OF THE INVENTION

1. Field of the Invention

The present invention relates to a trailer hitch arrangement for attachment to the drawbar of a towing vehicle and which is suitable for lifting and aligning a trailer tongue in place on a towing ball member mounted on the drawbar.

2. Prior Art

Aligning a trailer tongue with a conventional drawbar, provided with the usual ball member, is often difficult, since the ball member cannot be seen by the driver of the vehicle. Also, with a heavy trailer it may be difficult to lift the trailer tongue to just the right height required to engage the ball member. Various self-aligning and self-connecting hitch arrangements have been proposed to overcome these problems, for example those described in the following U.S. patents:

No. 4,657,275, issued Apr. 14, 1987 to Carroll;

No. 4,903,978, issued Feb. 27, 1990 to Schrum, 111;

No. 5,080,386, issued Jan. 14, 1992 to Lazar;

No. 5,435,587, issued Jul. 25, 1995 to Beddows; and

No. 5,503,422, issued Apr. 2, 1996 to Austin.

All of these patents show mechanisms in which, as the towing vehicle is backed into place, the trailer tongue is lifted to a suitable height to engage the towing ball member by a ramp mounted to the rear of the ball member, while the tongue is guided laterally by flanges or sidewalls which diverge outwardly and rearwardly from near the sides of the ball member. In the Austin patent, the ramp is removed manually when the tongue has reached the desired position over the ball member, and the tongue is then lowered onto the ball member. In the other patents, the ramp is arranged to drop automatically when the tongue has reached a suitable position over the ball member, so as to allow the tongue to fall into place on the ball member.

None of the arrangements shown in these prior patents appears to be in widespread use. It is believed that this may be due to the prior designs having one or more of the following drawbacks:

a) Undue complexity and expense;

b) Awkwardness in use, particularly in requiring dismantling or removal and storage of several parts; and c) Imposing restrictions on the movement of the tongue.

As indicated, in the Austin patent there is no automatic release or drop of the ramp member, so a series of manual operations are required to remove this and to lower the tongue. The Beddows patent shows a design in which, as the tongue moves into position, the ramp member firstly falls by a short distance, allowing partial engagement of the tongue with the ball member. To complete the connection, the ramp is allowed to drop further, and is then removed and stored separately. This arrangement is complex.

In the other three patents the ramp is hinged behind the ball member, i.e. on the trailer side of the ball member, and drops from an upwardly inclined position to a roughly horizontal position as the tongue moves into position, allowing the tongue to engage the ball member.

In the Lazar patent, the ramp member, having fallen to the horizontal position, remains in this position; this would seem to limit the downward pivoting of the tongue, which would interfere with the ramp member if it were to swing down more than about 10° from the horizontal. Normally, a trailer hitch should allow 20° or more downward pivoting of the tongue relative to the drawbar, from the normal horizontal position. In the Carroll design, parts including the ramp member, the extension which holds the ramp member, and the support which temporarily holds the ramp member, have to be separately removed, which is somewhat awkward. If they were not removed, they would certainly interfere with movement of the tongue. In the Schrum design, the ramp remains in place; this is possible since the ramp pivot is low relative to the ball member. However, this results in a steep ramp angle, of about 55° to the horizontal, and appears to require special anti-friction elements on the trailer tongue; presumably it would not work properly with a conventional tongue. The steep angle seems to result from a need to keep the pivot clear of the tongue, while at the same time avoiding having a large fixed extension behind the ball member.

These drawbacks of the last three patents are related to the placement of the ramp hinge behind (i.e. on the trailer side of) the ball member. Either this hinge will interfere with required movement of the tongue, as in Lazar, or it will require that the ramp and associated parts be removed, as in Carroll, or it will need a very steep ramp, as in Schrum.

SUMMARY OF THE INVENTION

The present invention avoids these drawbacks of the prior art by placing the pivot for the ramp member in front of the ball member. Herein the terms "in front" means "on the vehicle side", and "behind" means "on the trailer side of", i.e such terms are used in relation to the normal vehicle direction of travel.

In accordance with the present invention, a self aligning hitch arrangement for attachment to the drawbar of a towing vehicle and suitable for lifting and aligning a trailer tongue in place on a towing ball member mounted on the drawbar, comprises mounting means attachable to the drawbar and supporting a horizontal transverse pivot in front of the ball member, and a ramp member pivotally supported by the transverse pivot, this ramp member including a plate having a front edge spaced behind the ball member. The ramp member is pivotable between a raised position in which the plate lies at a suitable angle to provide a ramp capable of lifting the trailer tongue to a level at which it fits over the ball member as the vehicle and trailer are brought together, and a lowered position in which the plate lies at an angle steeper than this suitable angle, in which position it allows the tongue to engage the ball member. Guide means are positioned beside the plate and diverge rearwardly away from opposite lateral sides of the ball member to guide the trailer tongue into position over the ball member as the towing vehicle backs towards the trailer tongue.

The hitch arrangement also includes a latch carried by the mounting means, the latch having retaining means for holding the ramp member in its raised position and also having an abutment surface positioned to be moved by the tongue as the tongue becomes located over the ball member so as to cause the latch retaining means to release the ramp member allowing this to fall to its lowered position as the tongue engages the ball member.

The guide means are preferably provided by side flanges on the ramp member, the forwards ends of these flanges being carried by the horizontal pivot.

The mounting means preferably include a base member attachable to the drawbar, and laterally spaced side members extending upwardly from the base member and supporting the horizontal transverse pivot in front of the ball member.

The latch is pivoted to the side members below the horizontal pivot, the latch having shoulders which, in a rearmost position of the latch, hold the ramp in its raised position.

The ramp member, in its lowered position, may be arranged to be clear of the tongue in all normal movements of a towed vehicle, so that the ramp member does not require removal during a towing operation. Alternatively, the horizontal pivot may be removable along with the ramp member, whereby, after engagement of the tongue with the ball member, the ramp member can be repositioned above the tongue to hold the tongue in place on the ball member.

However, in a preferred arrangement, the horizontal pivot, being normally held in a pair of aligned bores in the side members, is removable along with the ramp member, and the side members are provided with a further pair of aligned bores below the first-mentioned pair for receiving the pivot in a lower position after removal of the ramp member. The pivot, when in its lower position, is capable of holding the latch member in a rearward position in which it lies partly over the tongue and prevents it becoming released from the ball member.

BRIEF DESCRIPTION OF THE DRAWINGS

A preferred embodiment of the invention will now be described by way of example with reference to the accompanying drawings, in which.

DETAILED DESCRIPTION

Figure 1:
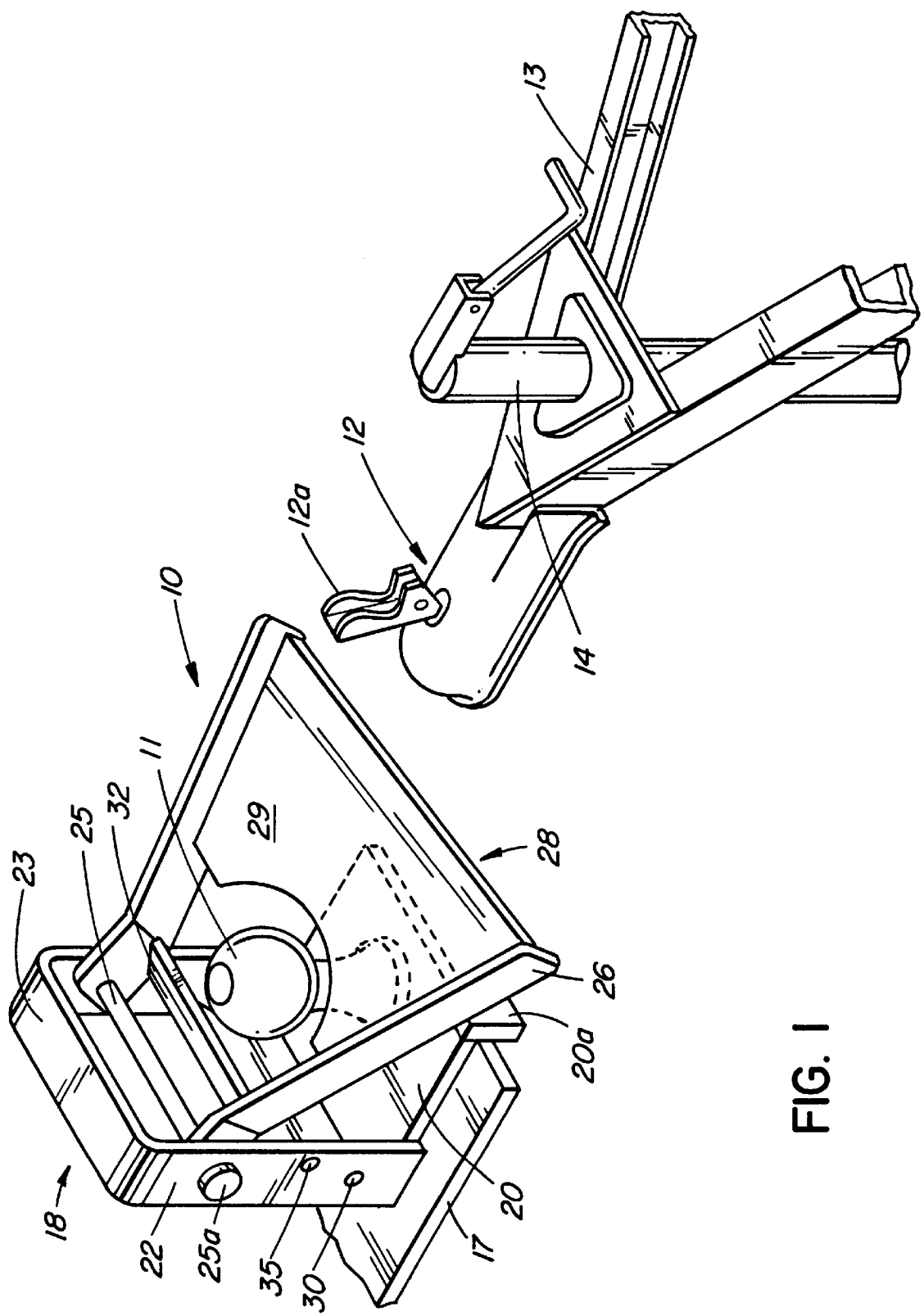
FIG. 1 is a perspective view of the hitch arrangement, shown with the trailer tongue to which it is to become attached.
Figure 2:
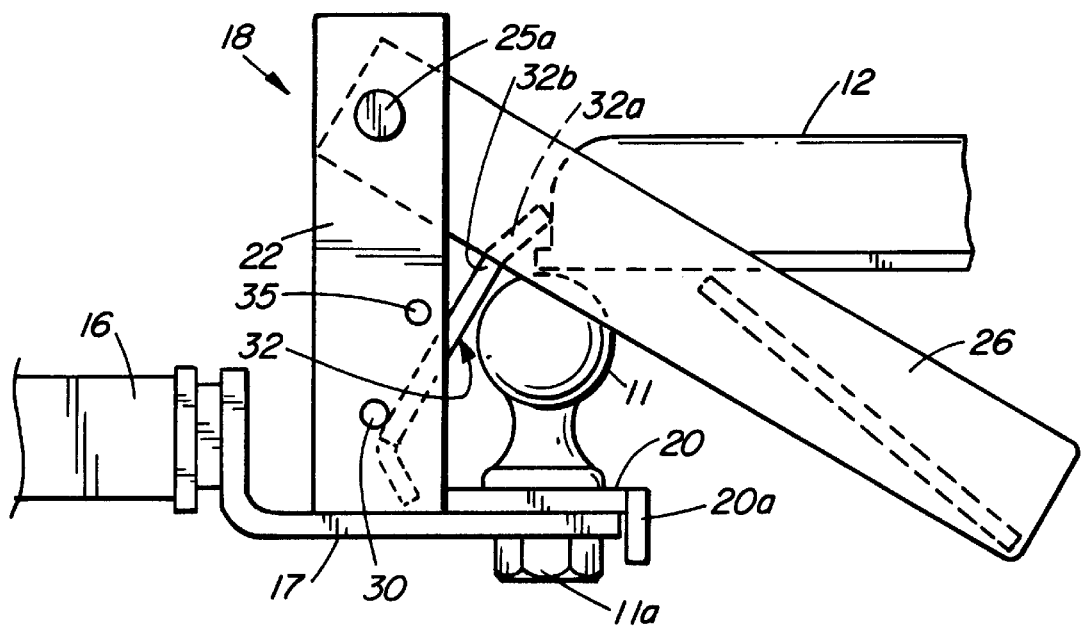
FIGS. 2 and 3 are side views of the hitch arrangement, with the trailer tongue and ramp member in successive positions.
Figure 3:
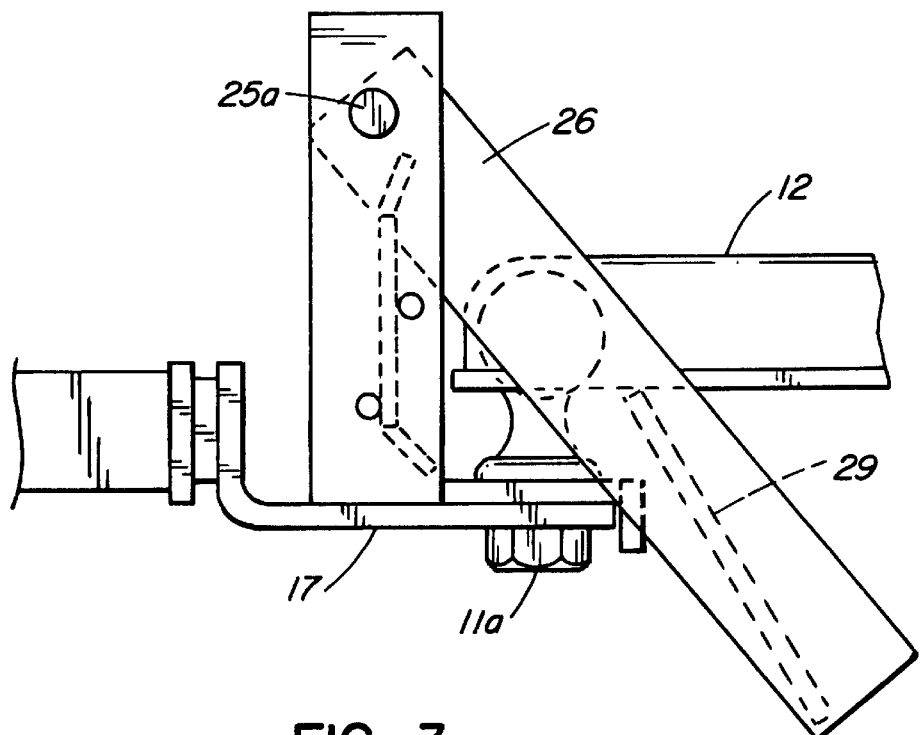
Figure 4:
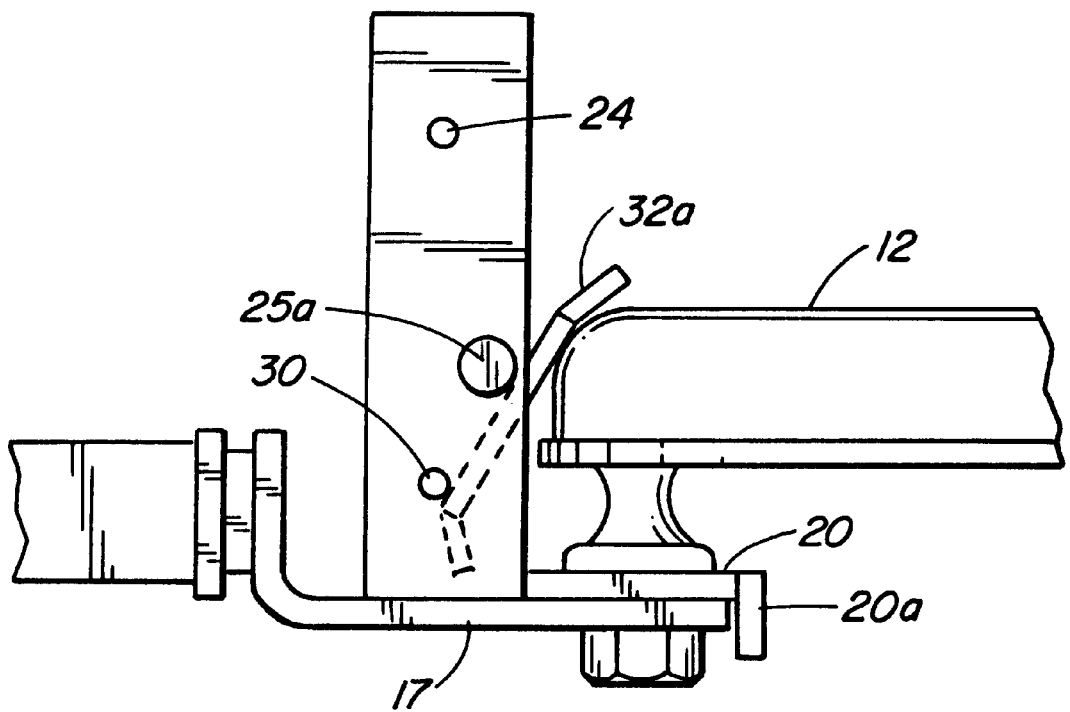
FIG. 4 is a view of the hitch arrangement, with the trailer tongue fully attached.

In FIGS. 1 and 2, the hitch arrangement 10 includes a conventional ball member 11, and is shown with its parts in position ready for coupling the ball member a into conventional socket in the underside of the tongue 12 of a trailer. As shown in FIG. 1, the towbar 13 of the trailer is supported by jack 14 at the normal towed height, so that the socket inside the tongue 12 is at approximately the same height as the ball member 11, i.e. the same height as it has in FIGS. 3 and 4 showing the engaged condition.

As shown, the vehicle drawbar 16 has a conventional plate-like extension 17, having an aperture which receives the bolt 11a of the ball member 11. The hitch arrangement of this invention includes mounting means 18 in the form of a base member or plate 20 which fits on top of the extension 17 and has an aperture for the bolt 11a, so as to be held in place on the extension 17 by the ball member and the bolt 11a. The front edge of plate 20 has depending lip 20a locating against front edge of plate 17 to prevent twisting of the plate 20 about the bolt axis. To the sides of the plate 20, in front of the ball member, are welded two vertical side members 22, formed as legs of a U-shaped bracket part with the upper ends of the legs connected by a cross-piece 23.

Near to their upper ends, the side members 22 have an upper pair of horizontally aligned bores 24 (seen in FIG. 4) for receiving a horizontal, transverse pivot pin 25 having at one end an enlarged head 25a and normally held in place by a cotter pin (not shown) at its other end. Pin 25 also passes through aligned bores at the front ends of a pair of side flanges 26 of ramp member 28 which are located immediately inside the members 22. The ramp member also comprises a flat ramp plate 29 having outwardly diverging lateral edges welded to these flanges 26, holding the flanges spaced apart and diverging outwardly from near the lateral sides of the ball member 11. The flanges 26 are designed so that when the ramp member is in the position shown in FIGS. 1 and 2 they guide the tongue laterally into position over the ball member. It will be seen with reference to FIG. 2 that the plate 29 slopes downwardly from front to rear relative to the flanges, so that the guide surfaces provided by the flanges are highest at the rear of the ramp member. The front edge of the plate 29 is concavely curved, and is spaced behind the ball member so as to allow the plate to drop down from a raised position, shown in FIG. 2, to a lowered position shown in FIG. 3, without the plate touching the ball part of the ball member.

When the ramp member 28 is in the raised position, the plate 29 lies at an angle of less than 45° (actually about 40°) to the horizontal, and is at a suitable angle for raising the tongue 12 to the level shown in FIG. 2 as the vehicle is backed towards the trailer. In this raised position the tongue is near enough to the top of the ball member to slide over the top of this. When the ramp member is in its lowered position, as in FIG. 3, the plate is sufficiently low to allow the tongue to be fully engaged on the ball member.

Below the bores 24 of the side members 22 is another pair of aligned bores which hold a latch pivot 30, to the rear side of which is welded latch 32. This latch is in the form of a plate with an upper, central, rearwardly bent actuator portion 32a, and two lateral shoulders 32b which fit under the lower edges of the side flanges 26 and which can support the flanges in the raised position when the latch is tilted into the rearward position shown in FIG. 2. One side member 22 may have a stop to limit this movement. The parts will stay in that position until disturbed, since the latch is then slightly over-center. The actuator portion 32a is then in position to be moved forwards, relative to the vehicle, by the tongue 12 as the vehicle is moved backwards towards the trailer.

Thus it will be seen that with the ramp member lifted into the raised position and held in that position by the latch, as shown in FIG. 2, the ramp member will both lift and guide the tongue 12 into position over the ball member, and that when the tongue has reached this position it will strike the actuator portion 32b of the latch, pushing this backwards and causing the ramp member to fall to the lowered, FIG. 3 position, whereupon the tongue falls onto the ball member. The conventional tongue locking lever 12a is then moved to the locked position to hold the tongue in place.

With suitable proportioning of the parts, the vehicle may be driven with the ramp member still in place. However, to avoid possible interference with the tongue, the ramp member is preferably removed, by removal of the pivot 25 after release of its cotter pin, and stowed separately in the vehicle.

The hitch arrangement may also be used as a security device to positively prevent the tongue from coming off the ball member.

One way this may be done is to remove the ramp member, by removal of the pivot 25, and then to reinstall this above the tongue. Another security arrangement involves holding the latch in a position in which it secures the tongue. This makes use of a further pair of aligned bores 35 in side members 22 which are below the bores 24, as shown in FIG. 2. After the tongue has been coupled to the ball member as described, the pin 25 is removed from the upper bores 24 and from the ramp member, and is reinserted into the lower bores 35 in front of the latch, which is tilted to a rear position, as shown in FIG. 4. The pin 25 holds the latch in this rear position, where the bent-over actuator part 32a rests partly over the tongue and prevents it from becoming dislodged.

One possible modification is that instead of the plate 29 having its edges welded to side flanges 26, it may have bent up flanges welded to side members which are carried by pivot 25. Other possible modifications relate to the nature of the connection between the plate 20 and the drawbar; for example these may be connected by a pair of bolts, in which case the lip 20a is not required.

I claim:

1. A self aligning hitch arrangement for attachment to the drawbar of a towing vehicle, and suitable for lifting and aligning a trailer tongue in place on a towing ball member mounted on the drawbar, comprising:

mounting means attachable to the drawbar for supporting a horizontal transverse pivot in front of the ball member, a ramp member pivotally supported by said transverse pivot, said ramp member including a plate having a front edge spaced behind said ball member, said ramp member being pivotable between a raised position in which the plate lies at a suitable angle to provide a ramp capable of lifting the trailer tongue to a level at which it fits over the ball member, and a lowered position in which the plate lies at an angle steeper than said suitable angle, said plate being arranged so that in said lowered position it allows the tongue to engage the ball member, guide means positioned beside said plate and diverging rearwardly away from opposite lateral sides of the ball member to guide the trailer tongue laterally into position over the ball member as the towing vehicle backs towards the trailer tongue, the hitch arrangement also including a latch carried by said mounting means, said latch having retaining means for holding the ramp member in its raised position, said latch also having an abutment surface positioned to be moved by the tongue as the tongue becomes located over the ball member, this movement of the latch causing the latch retaining means to release the ramp member and allowing this to fall to its lowered position and the tongue to engage the ball member.

2. A hitch arrangement according to claim 1, wherein said guide means are provided by flanges on said ramp member, the forwards ends of the flanges being carried by said horizontal pivot.

3. An arrangement according to claim 1, wherein the ramp member, in its lowered position, is clear of the tongue in all normal movements of a towed vehicle, so that the ramp member does not require removal during a towing operation.

4. An arrangement according to claim 1, wherein the horizontal pivot is removable along with the ramp member, whereby, after engagement of the tongue with the ball member, the ramp member can be repositioned above the tongue to hold the tongue in place on the ball member.

5. An arrangement according to claim 1, wherein said suitable angle of said plate, when the ramp member is in its raised position, is less than 45° to the horizontal.

6. A self aligning hitch arrangement for attachment to the drawbar of a towing vehicle, and suitable for lifting and aligning a trailer tongue in place on a towing ball member mounted on the drawbar, comprising:

a base member attachable to the drawbar, laterally spaced side members extending upwardly from the base member and supporting a horizontal transverse pivot in front of the ball member, a ramp member comprising upstanding side flanges which diverge outwardly and rearwardly from said side members and which have their front ends carried by said pivot, and further comprising a plate extending between said side flanges, a front edge of said plate being spaced behind said ball member, said ramp member being pivotable about said horizontal pivot between a raised position in which said plate lies at a suitable angle to provide a ramp for lifting the trailer tongue to a level at which it fits over the ball member while the side flanges guide the tongue laterally into position over the ball member, and a lowered position in which the ramp member lies at an angle steeper than said suitable angle and allows the tongue to engage the ball member, and further comprising a latch pivoted to the side members below said horizontal pivot, said latch having retaining means which, in a rearmost position of the latch, hold the ramp in its raised position, said latch also having an abutment surface positioned to be moved by the tongue as the tongue becomes located over the ball member, this movement causing the latch retaining means to release the ramp member and allowing this to fall to its lowered position and the tongue to engage the ball member.

7. An arrangement according to claim 6, wherein the latch retaining means are constituted by shoulders which are capable of supporting the side flanges of the ramp member.

8. An arrangement according to claim 6, wherein the ramp member, in its lowered position, is clear of the tongue in all normal movements of a towed vehicle, so that the ramp member does not require removal during a towing operation.

9. An arrangement according to claim 6, wherein the horizontal pivot is removable along with the ramp member, whereby, after engagement of the tongue with the ball member, the ramp member can be repositioned above the tongue to hold the tongue in place on the ball member.

10. An arrangement according to claim 6, wherein said suitable angle of said plate, when the ramp member is in its raised position, is less than 45° to the horizontal.

* * * * *